Nov. 28, 1933.       H. DUTZMANN       1,936,963
SYSTEM OF DISTRIBUTING AND TESTING TERMINALS ARRANGED IN ROWS
Filed Dec. 21, 1929       2 Sheets-Sheet 1
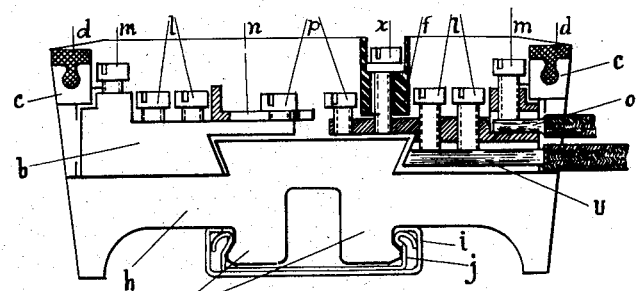
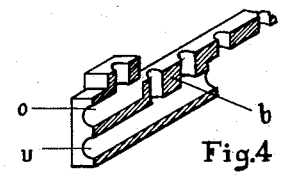
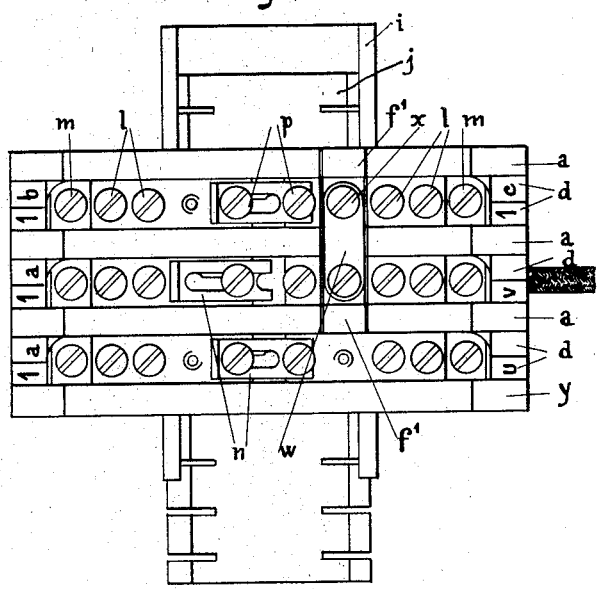
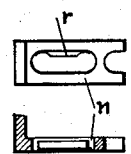
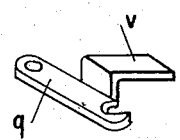
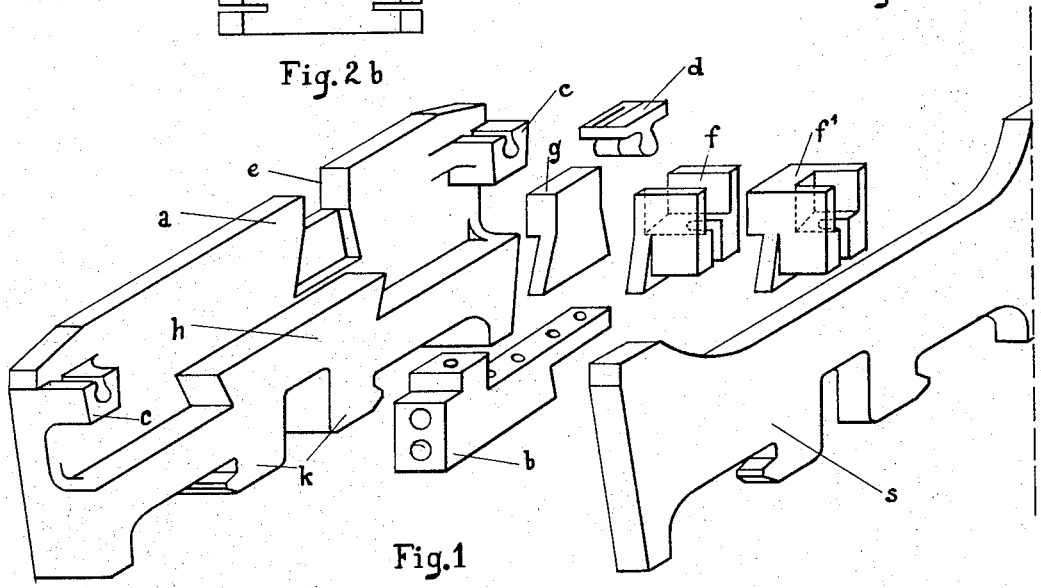

Nov. 28, 1933.   H. DÜTZMANN   1,936,963
SYSTEM OF DISTRIBUTING AND TESTING TERMINALS ARRANGED IN ROWS
Filed Dec. 21. 1929   2 Sheets-Sheet 2
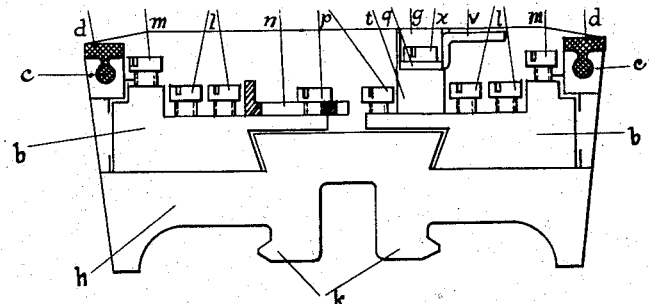
Fig. 3a
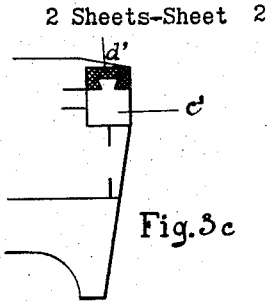
Fig. 3c
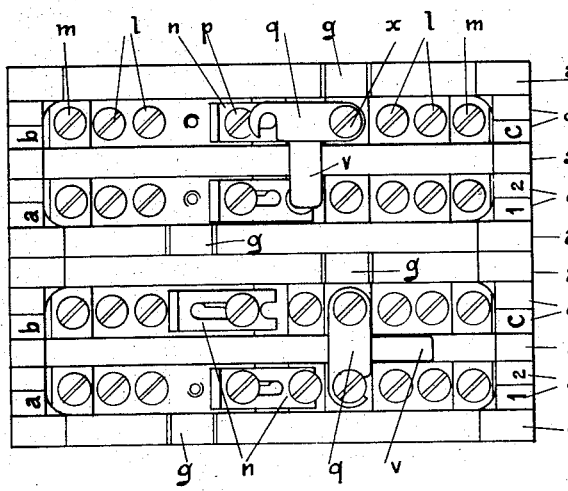
Fig. 3b
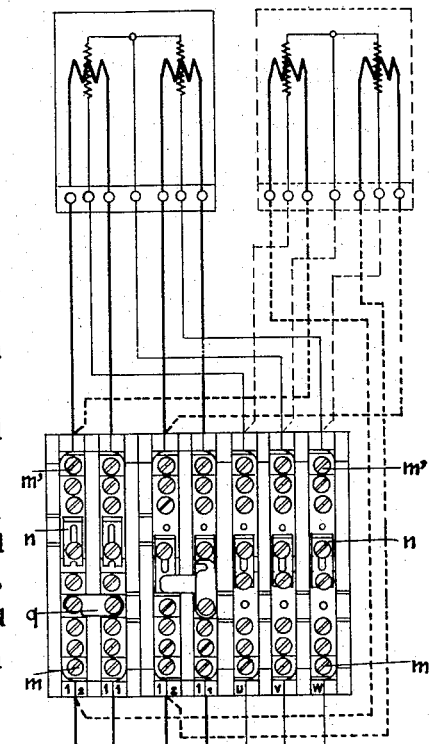
Fig. 8
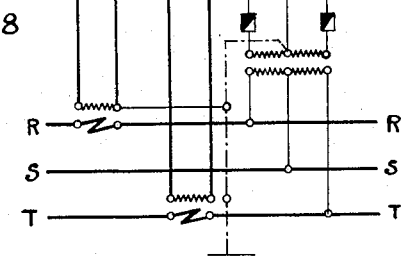

Patented Nov. 28, 1933

1,936,963

UNITED STATES PATENT OFFICE 1,936,963

SYSTEM OF DISTRIBUTING AND TESTING TERMINALS ARRANGED IN ROWS

Heinrich Dützmann, Durlach, near Karlsruhe, Germany

Application December 21, 1929, Serial No. 415,759, and in Germany December 13, 1928

15 Claims. (Cl. 175—369)

For connecting in electric lines switchgear terminals in rows are used which are placed together as required on a fixing bar. According to recent principles these terminals are intended to serve not merely for connecting purposes but also for testing (checking) purposes for verifying the condition of the line and for the calibration of the instruments connected by the lines. From the point of view of actual operation such terminals must satisfy the following technical requirements.

(1) Possibility of cutting-in calibrating and checking instruments into the circuit without detachment of the working lines connected up, in order to avoid wrong connections and line breakages.

(2) Effectuation of the test connections without the use of additional aids not connected with the terminals.

(3) Clearly evident arrangement of the particular position of connections at the moment in calibration and checking work.

(4) Good possibility of "distinction" of the lines connected up.

(5) Protection against chance bridging over of adjoining terminals in order to prevent short circuits.

(6) Reliable fixing of the connecting wires.

(7) Simple mode of fixing and easy interchangeableness of the terminals.

(8) Limitation in the number of terminals required to effect a particular scheme of connections.

(9) Locking of transformer circuits to the terminals in such manner that they can only be broken after previous bridging over of the transformer feed lines.

The system of terminals described below satisfies all these requirements.

For the purpose of simple maintenance of stock and for cheapening, a model has been designed which can when suitably used be operated both as a current transformer terminal and also as a voltage and signal line terminal. For the same reason importance has been attached to symmetrical design of all parts.

On the drawings appended which show a construction by way of example of the terminal:

Figs. 1, 4, 5 and 7 are a perspective view of the terminal parts.

Fig. 2a is a view of the voltage terminal.

Fig. 2b is a plan view of a group of voltage terminals.

Fig. 3a is a view of a current terminal.

Fig. 3b is a plan view of two current terminal groups.

Fig. 3c is a detail sectional view of a modified form of the plate holders and plates.

Fig. 6 is a detail plan and a detail section of one of the break slides.

Fig. 8 is a scheme (wiring) of a working and checking meter connection.

The terminal holder Fig. 1 (a), made of insulating material (porcelain, steatite, etc.) serves for receiving and electrically separating the metal terminal bodies (b). At both ends of the terminal carrier there are plate holders (c) to receive distinctive plates (d) of coloured pressed material for the arriving and departing lines. In Fig. 3c is shown a modified construction of a plate holder c' and a plate d'. The slot (e) permits the insertion of an insulating piece (f') which is held by the dove-tailed shape in the terminal holder, for the metallic connection of a number of terminals into a group as is sometimes required. In current transformer circuits the slots (e) is filled by the filling piece (g). By the plate holders on the one hand and the dovetail design of the terminal base (h) on the other hand, the terminal bodies (o) are held in the terminal holder or carrier. The dovetailed foot (k) serves for fixing the terminal in the terminal bar. The metallic terminal body consists of two entirely symmetrical terminal body parts (b) of Fig. 1 and 4. Each part has two bore holes to receive wires Fig. 2a. The bottom insertion opening (u) is longer and serves to receive the line laid for working purposes, which is for the sake of reliability fixed by two screws (1). The upper insertion opening (o) is shorter and only serves for the temporary fixing of testing wires which are clamped by the screw (m). The break slide (n) Fig. 6 lies between two terminal body parts (b) and is connected with them in each case by a screw (p). In order to improve its operation it is fitted with a nosing. With the object of keeping the slide fixed in any desired position and prevent unintentional closure on loosening the screw, a small plate spring (r) is arranged in the inner slot of the slide which spring presses against the shank of the screw and provides the necessary friction.

Any suitable number of the terminal holders or carriers a may be employed in a group, as required, each said holder or carrier provided with two of the terminal bodies or pieces b to which the wires are attached, as shown in Figures 2a and 3a. Between each pair of holders or carriers a is inserted an insulating member s which is a wall of insulating material and which corresponds in length and breadth and approximately also in shape with the holders or carriers. The short circuiting arch piece $q$ is spaced above one of the terminal bodies $b$ by a spacer member $t$, the arch piece spacer member and body being secured together by a screw $x$ as shown in Figure 3a, the said screw forming a pivot which enables the arch piece or connector to be arranged either parallel with the body $b$ or at right angles thereto and to extend across the intermediate insulating member $s$ and bear on a spacer member and bear on a corresponding spacer member on the next adjacent laterally spaced terminal body and engage and be secured by a screw $x$ thereof, as shown at the bottom of Figure 3b, to enable short-circuiting to be effected. In the form of the arch pieces $q$ shown in Figure 7, the same is provided with a laterally extending nose or arm $v$ to bear on a screw $x$ of a laterally adjacent terminal body and thereby cover said screw and prevent the same from being by mistake loosened and hence insuring fastening of the corresponding break slide or connector $n$, as shown in the upper part of said Figure 3b. This is particularly desirable before shortcircuiting of current transformer phase has been effected.

When the device is employed to provide voltage or signal line terminals, a bridge piece $w$ is used instead of the member $q$, as shown in Figures 2a, 2b. The bridge piece or metallic connector $w$ enables several terminals to be connected together, as shown. To enable some of the terminals to be separated electrically from a group, the insulating piece $f$ is employed, which after removal of a screw $x$ can be used to effect separation between the bridge piece or connector and the terminal body of the particular terminal. In case the terminal bodies would be otherwise exposed in the grooved or recessed side of a carrier member $a$, the same may be covered by a shut off piece or member $y$, made of insulating material, as shown in Figure 2b, which shut off piece corresponds in length, breadth and form with the members $a$.

The fixing of the terminals takes place as shown in Fig. 2a.

The terminals, which have a dove-tailed foot $(k)$ are simply pressed into the bar. The fixing bar consists of a rigid bar $(i)$ into this an insertion band $(j)$ of suitable form, and resilient, is passed right through, being slotted for better adaptation to the terminals, or for flexing. A second variant consists of a single bar which corresponds substantially in shape to the insertion band.

Mention must further be made of a protection spring shown in Fig. 5 which is run from the ends of the terminals into the line openings and prevents the feed lines being twisted off by the fixing screws.

Both break slides and also shorting stirrups or bridge pieces are known in themselves. A new feature, however, is the combined use of these elements in the terminals whereby the carrying out of all working processes of connecting up and checkings is first made possible directly on the terminals without loosening any lines laid for working purposes. A further advantage of this combination lies in the reduction of the number of terminals required as compared with known systems which do not possess this combination.

New likewise is the possibility of fixing the slide $(n)$ obtained by the spring $(r)$ and also the locking of the break slide $(n)$ to the current terminals by the shorting stirrups $(q)$. A further novelty are the plate carriers arranged at both ends of the terminals and the original design of the distinctive plates.

The possibility of switching on testing instruments without disconnecting the working lines is a particularly important feature of the terminal (Fig. 8). Thus for example on switching on a testing instrument into a current transformer circuit it is switched on by means of the test screws ($m$ and $m'$) in parallel to a current terminal. On disconnecting the break slide $(n)$ the instruments are connected in series. Putting the testing instrument out of operation is done in the reverse order. The shorting stirrup $(q)$ is required when interchanging the instrument or when calibrating it by outside current, for the purpose of shorting the corresponding current transformer. In the latter case, of course, the break slide $(n)$ must also be pulled. The connecting up of the outside source of current is then done by means of the upper testing screws ($m'$). The voltage circuit of the testing instrument is closed by connection in parallel to the voltage terminals by the use of the testing screws ($m'$). The break slide $(n)$ further serves for separating the branches when checking the condition of insulation of the lines or the apparatus connected up to them for example as to earthing etc. As in these tests it is not necessary to disconnect any working connection, the impossibility of any mixing up of the lines, and therefore the avoiding of wrong connections in consequence and prevention of breakage of the lines owing to their repeated loosening is ensured.

A particularly important feature of the terminal is the saving in space which it permits of obtaining. The new system of terminals owing to its suitable (efficient) construction allows of considerable economy because when using it a number of terminals will be sufficient far smaller than in all systems hitherto known, with the same wiring (connections). For example there are required for connecting up a current indicator two terminals instead of three, for connecting up an instrument with two systems of current only four current terminals instead of six as in the known systems (Fig. 8).

Having now particularly described and ascertained the nature of my said invention and in what manner the same is to be performed, I declare that what I claim is:—

1. A terminal system comprising an insulating carrier member having supporting shoulders on one side extending to its opposite ends, terminal body members detachably arranged on said shoulders and having binding screws for wires, a break slide connector detachably secured to said body members and arranged to connect and disconnect said body members, and an insulating member detachably secured to the insulating carrier member on the shouldered side of the latter, to cover one of said terminal body members.

2. A current terminal system comprising a pair of insulating carrier members arranged side by side, a pair of terminal body members in each carrier member, spaced apart at their opposing ends, means to electrically connect and disconnect each pair of terminal body members, and means to electrically connect and disconnect the load and supply terminals to laterally adjacent terminal body members, one of the said insulating terminal carriers being adapted for current transformer and voltage or operating terminals and having a recess, and interchangeable insulating members for insertion in said recess.

3. Terminal system according to claim 1, in which the terminal plate carriers (c) are provided at both ends with recesses which serve to receive and hold distinctive plates (d).

4. Terminal system according to claim 1, including distinctive plates (d) and in which the plate carriers are provided with means whereby the said plates may be inserted groove and tonguewise, without the use of metal fixing devices, directly into the plate carriers.

5. Terminal system according to claim 1 including break devices (n) and holding means by which they may be fixed in position from time to time.

6. A current terminal system according to claim 2, including shorting (q) and breaking (n) devices provided on the terminals, and means whereby said devices may be connected to terminal bodies as may be desired.

7. Current terminal systems according to claim 2 thereby characterized that by reversed (as in a mirror reflection) use of the terminal carrier (a), closed groups of terminals are formed in order to distinguish circuits which belong together and including an insulating member for the said terminal carrier when the latter is reversed.

8. A terminal system as claimed in claim 1, including means detachably and hingedly connecting the carrier member and the insulating and covering member together.

9. A terminal system as claimed in claim 1, in which the break slide connector is mounted on one of the terminal bodies for longitudinal movement for engagement with or for disengagement from the other terminal body, and including means independent of the mounting means for fixing said longitudinally movable connector in either of such positions.

10. A terminal system comprising an insulating carrier a, two conductive pairs of terminals b interchangeably insertible into the insulating carrier, said terminals being located opposite each other and having a clearance space between their ends, each terminal or clamping element having at least three contact points, of which one contact point l serves for connecting the operative wires therewith; the second contact point c serves for making a conductive connection between the two terminal elements by means of a metallic connector slide n; the third contact point serves with the upper terminal as a contact point m for the attachment of a test wire, and serves with the lower terminal as contact point x for making a conductive connection between two or more adjacent terminals by means of a second metallic contact part w or q, which is constructed as a plate or plug.

11. A current terminal system, as set forth in claim 10, in which the insulating carrier a has a raised guard flange and having a shield carrier c at the two end faces, which carrier projects laterally, and also having additional elements g, f or f' serving for insulating connection of the recess e and of the part f, f' for receiving the conductive connecting element w.

12. A current terminal system comprising a pair of insulating carriers arranged side by side, a pair of terminal bodies in each carrier having a clearance space at their opposing ends, means for electrically connecting and severing each pair of the terminal bodies, and means for electrically connecting and separating one of the terminals with or from the laterally located adjacent terminal.

13. Terminal system according to claim 1, including a rigid bar extending transversely of and connecting the carrier members and insulating and spacing members, and also including a spring bar in said rigid bar, said spring bar being provided with comb-like fingers enabling the carrier members to be each interchangeable independently of the others.

14. Current terminal system according to claim 2, in which the means to electrically connect and disconnect a pair of terminal body members has means whereby it is locked in such manner that the break can only be effected if the adjoining terminal is bridged by one of the laterally connecting and disconnecting devices.

15. Current terminal system according to claim 2, in which the means to electrically connect and disconnect a pair of terminal body members has means whereby it is locked in such manner that the break can only be effected if the adjoining terminal is bridged by one of the laterally connecting and disconnecting devices, and said laterally connecting and disconnecting device has a lateral nosing arranged when in the normal position to lock the break device of the adjoining terminal.

HEINRICH DÜTZMANN.